(No Model.) 5 Sheets—Sheet 3.
C. P. STANBON.
ROUNDING OUT AND CHANNEL FLAP TURNING MACHINE.
No. 375,960. Patented Jan. 3, 1888.
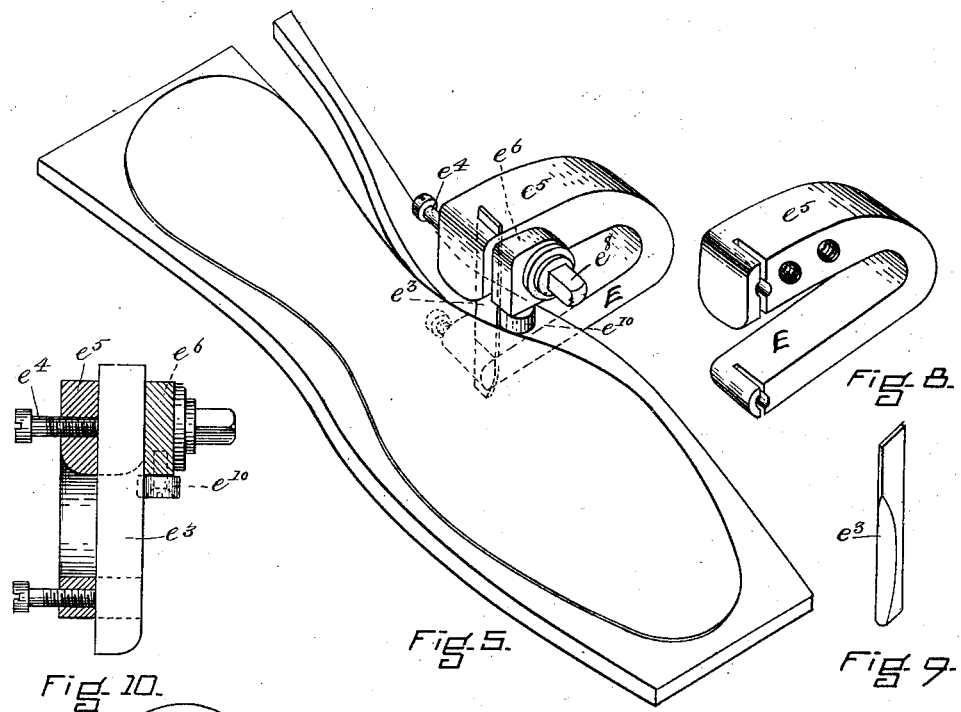
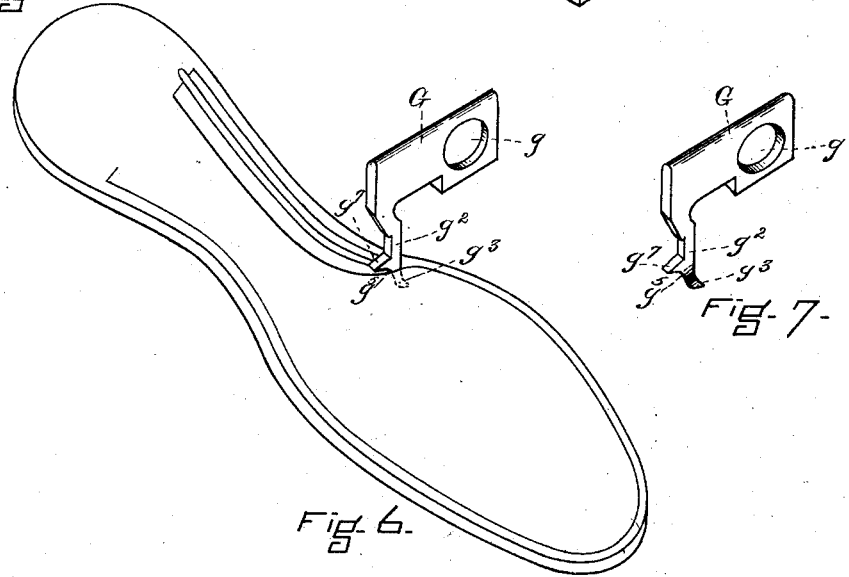
WITNESSES:
INVENTOR:

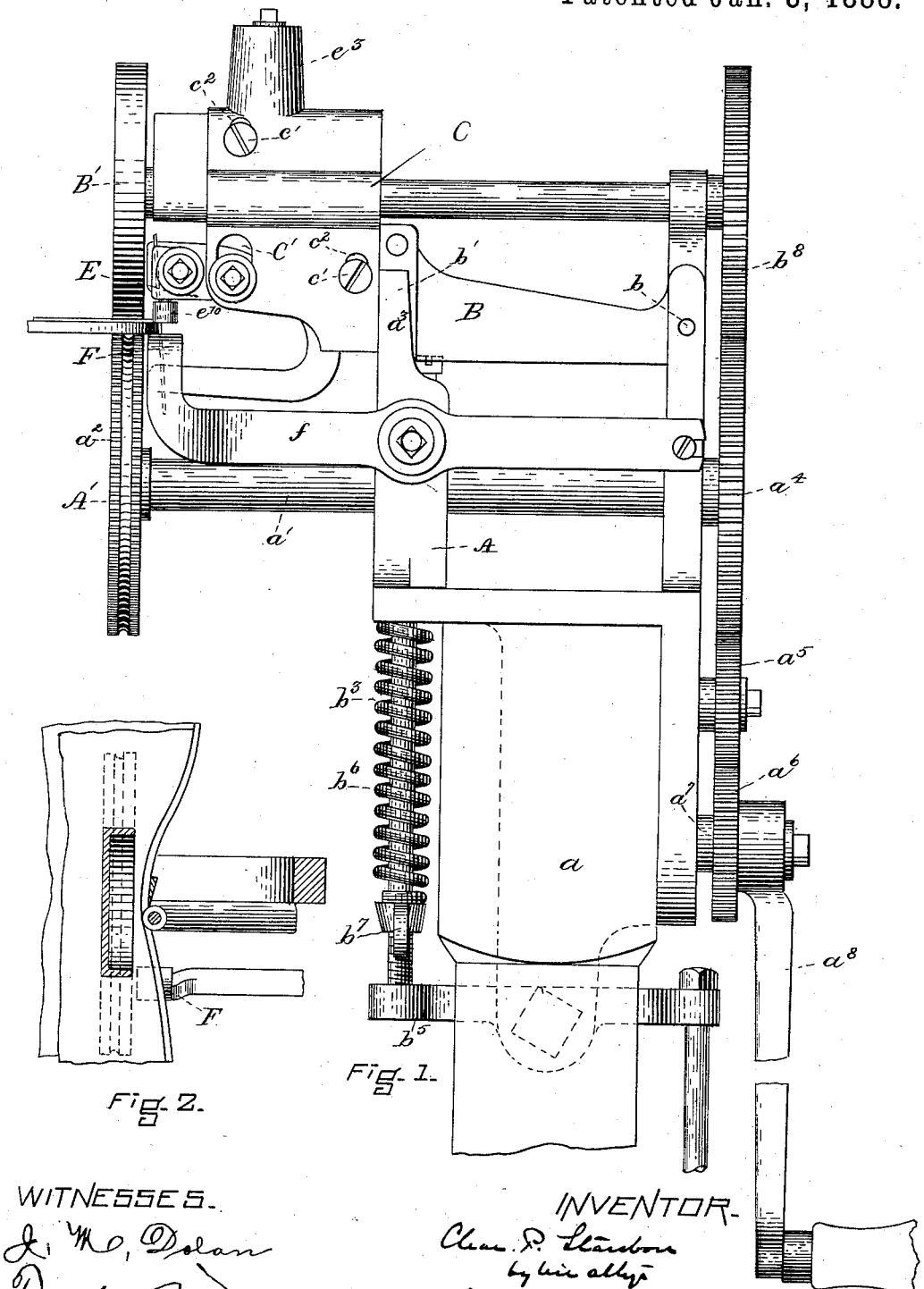

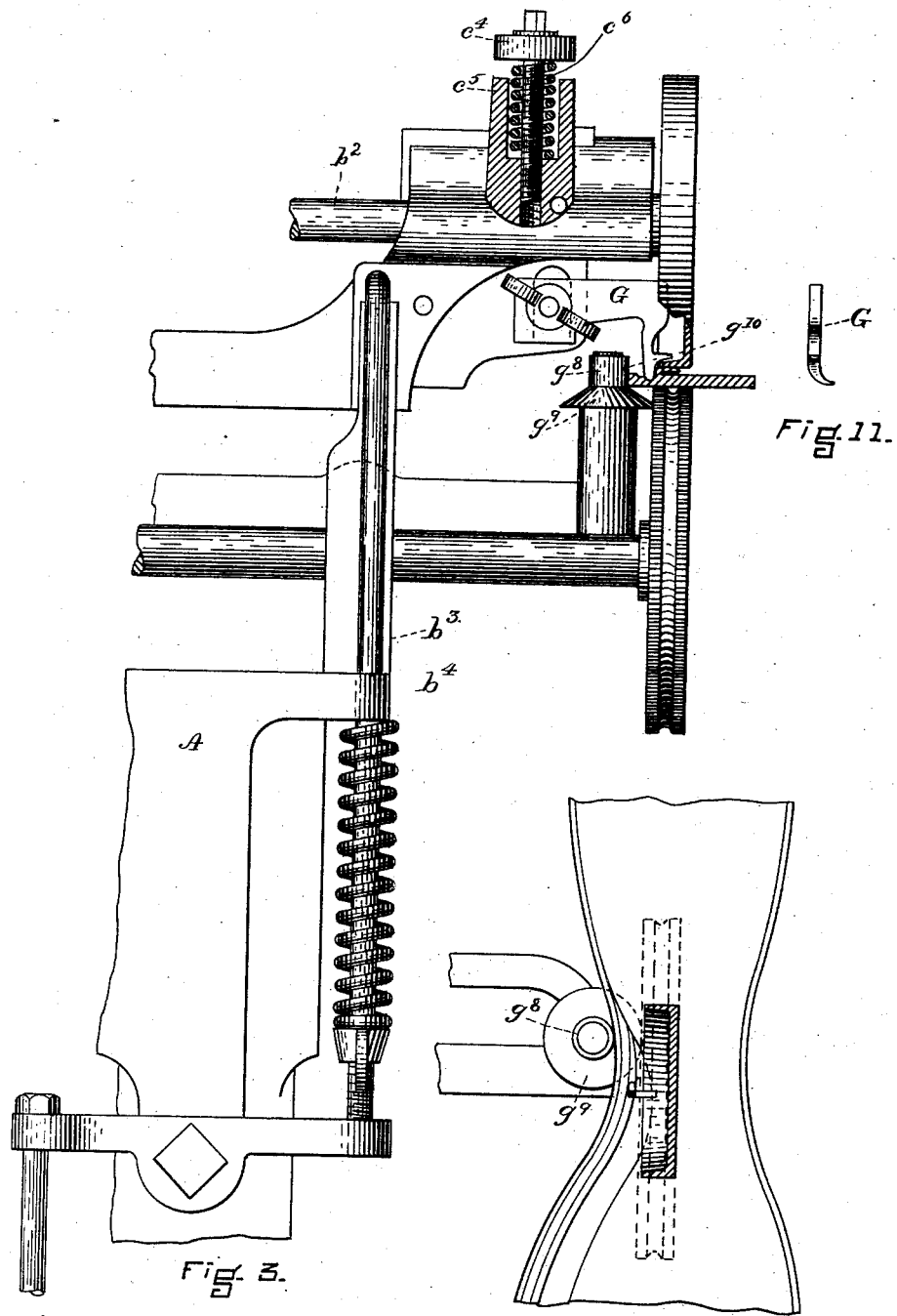

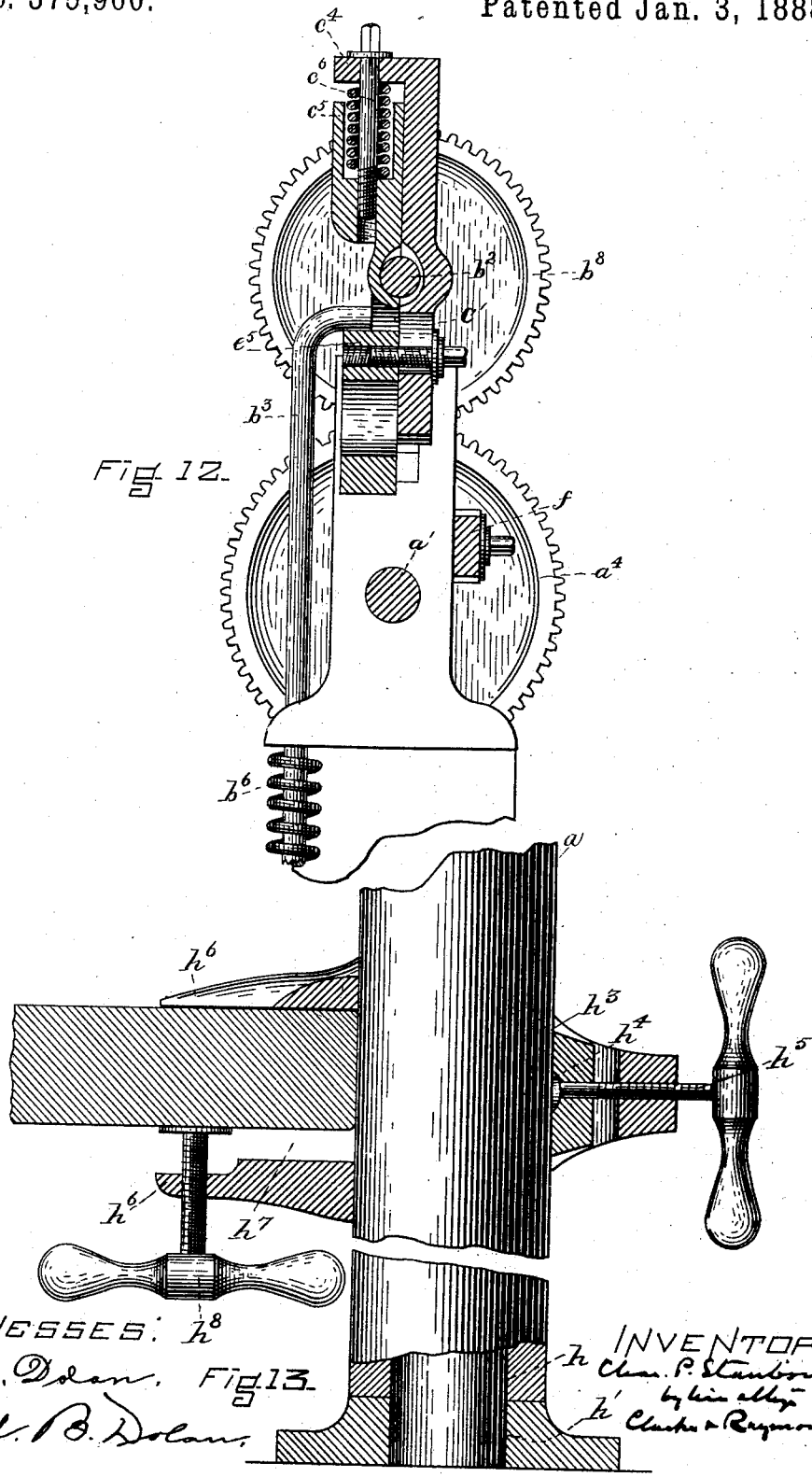

(No Model.) 5 Sheets—Sheet 5.

C. P. STANBON.
ROUNDING OUT AND CHANNEL FLAP TURNING MACHINE.

No. 375,960. Patented Jan. 3, 1888.

WITNESSES.
J. M. Dolan
E. P. Small

INVENTOR
Chas. H. Stanbon
by his attys
Clarke & Raymond

UNITED STATES PATENT OFFICE.

CHARLES P. STANBON, OF LYNN, MASSACHUSETTS.

ROUNDING-OUT AND CHANNEL-FLAP-TURNING MACHINE.

SPECIFICATION forming part of Letters Patent No. 375,960, dated January 3, 1888.

Application filed April 21, 1887. Serial No. 235,641. (No model.)

*To all whom it may concern:*

Be it known that I, CHARLES P. STANBON, of Lynn, in the county of Essex and State of Massachusetts, a citizen of the United States, have invented a new and useful Improvement in Combined Rounding-Out and Channel-Flap-Turning Machines, of which the following is a full, clear, and exact description, reference being had to the accompanying drawings, forming a part of this specification, in explaining its nature, in which—

Figure 14:
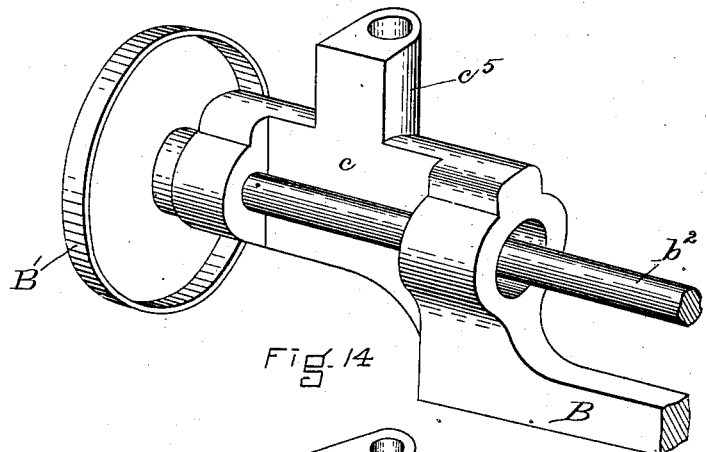
Figure 15:
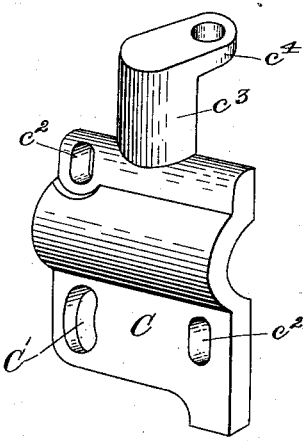
Figure 16:
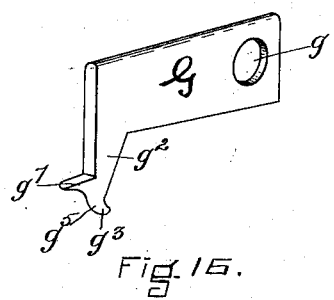

Figure 1 is a view in elevation of a machine having the features of my invention with the rounding-out knife and gage-roll in operative position. Fig. 2 is a view in section upon the dotted line $xx$ of Fig. 1 and in plan of the parts below said line. Fig. 3 is a view of a portion of the machine in rear elevation, representing the use of a flap-folding tool. Fig. 4 is a horizontal section upon the dotted line $yy$ of Fig. 3 and in plan of the parts below said line. Fig. 5 is a detail view in perspective, illustrating the operation of the rounding-out devices upon the sole-blank. Fig. 6 is a view in perspective, illustrating the operation of the channel-flap folder upon a sole. Fig. 7 is a view in perspective of the removable plate having the flap-folding tool or device formed upon it. Fig. 8 is a perspective of the movable two-part block for holding the rounding-out knife. Fig. 9 is a view in perspective of the knife. Fig. 10 is a section taken through the guide-roll of the knife-holding block. Fig. 11 is a view in elevation of the flap-folding device represented in Fig. 7. Fig. 12 is a view, part in section and part in end elevation, of the machine. Fig. 13 is a detail view of its post and mechanism for fastening it in place. Fig. 14 is a view in perspective of a portion of the machine, representing especially the support for the shaft carrying the pressure-roll and a recess in which the block carrying the tools is movable. Fig. 15 is a view in perspective of the tool-holding block. Fig. 16 is a view in perspective of the flap-turning tool.

Referring to the drawings, A represents the frame of the machine. It is mounted upon the post $a$, and it has the horizontal shaft $a'$, at one end of which is mounted the feed-roll A', which has the roughened or serrated edge $a^2$.

There is attached to the frame A a movable block, B, which is pivoted at $b$ to the frame A, and is guided in the recess $b'$ in the post or section $a^3$ of the frame A. It supports the shaft $b^2$, which carries at one end the smooth-faced pressure-roll B', arranged over the feed-roll A'.

There is attached to the block or support B, upon one side, the rod $b^3$, which extends downward through a hole, $b^4$, in the frame, and its end rests upon the surface of a short lever, $b^5$. This rod carries an actuating-spring, $b^6$, which bears against the under surface of the frame A, and against a thumb-screw, $b^7$, and serves to draw and hold the block B, and consequently the smooth-faced pressure-roll, in proper position in relation to the surface of the feed-roll, and so that it may yield or give vertically in relation thereto. The lever $b^5$ is connected by a rod with a treadle, so that the pressure-roll may be lifted to permit the sole to be placed between the two rolls, and the treadle is then released and the sole is held to the feed-roll by the pressure-roll, which is forced thereon by spring-pressure only. The feed-roll shaft $a'$ is driven by a gear, $a^4$, which serves to drive the gear $b^8$ on the pressure-roll shaft $b^2$, and the gear $a^4$ is itself driven by the intermediate gear, $a^5$, and the gear $a^6$ on the shaft $a^7$. Its shaft has a crank or handle, $a^8$, by which it is turned.

There is attached or secured to the upper block, B, preferably in a manner to be vertically adjustable thereon, a supporting-block, C. This block C fits a vertical recess in the front side of the block B, and is secured to the block in a manner to permit it to be vertically moved by means of the screws $c'$, which pass through slots $c^2$ formed therein. The block C also has an upward-extending post, $c^3$, provided with a lateral projection, $c^4$, which extends over the post $c^5$, extending upward from the movable block B, and the projection $c^4$ bears a screw, $c^6$, secured to it by collars, so as to turn therein, which enters a screw-hole in the post $c^5$, and by means of which the vertical position of the block C is varied. This block C serves to hold the gage and connecting-knife of the rounding-out device and also the flap-turner of the channel-flap-turning device.

I will first describe the rounding-out knife and guard. The block C has a large slot, C', at its front lower corner, which receives the bolt $e$, carried by the forked or two-armed knife or gage support E, (see Figs. 5 and 8,) the bolt extending through said slot and receiving a washer and locking-nut, by which it is secured to the block. This forked or two-armed support E has formed across its end the recesses $e^2$, in line with each other and adapted to receive a straight thin cutting-blade, $e^3$. The adjusting screw $e^4$ extends into each recess, and the back of the blade bears against them, and the position of the knife cutting-edge as it wears is adjusted by them.

Secured to the upper arm, $e^5$, of the forked support is a small block, $e^6$, which has a slot receiving the bolt $e^8$, by which it is fastened to the front surface of the said arm, the slot permitting the block to be adjusted vertically and horizontally. In the lower edge of this block there is a vertical stud, $e^9$, which carries a small gage-roll, $e^{10}$. The forked knife-support is so held in relation to the upper pressure-roll, B, and the lower feed-roll, A', that the cutting-edge of the knife is brought closely to the inner side of the meeting point of the rolls, and so that the edge of the knife shall be upon a center drawn from the center of one roll to the other, and the gage-roll $e^{10}$ is supported by its block $e^6$ in relation to the cutting-ege of the knife, so as to be immediately above and in advance of the cutting-edge thereof, and so as to project very little below the upper surface of the pressure-roll. The block $e^6$ also serves to hold the knife in its recesses, the edge of the block extending over the recess in the upper arm, and the adjustments which are provided the block carrying the roll, the forked support carrying the knife and supporting the gage-roll block, and the sliding vertically-adjustable block to which the forked knife-block is secured are for the purpose of permitting the edge of the knife and the gage-roll to be finely or closely adjusted to the positions in relation to the rolls above given. There may also be used in connection with the devices described a rest or support, F, for the sole. This rest is represented as provided by the arm $f$, fastened to the frame A by a bolt passing through a hole in the arm and having its end curved inward toward the knife, so that its surface forms a rest slightly above and at one side of the feed-roll.

In the operation of rounding out a sole the sole is first died out to a form approximating the finished sole. A zinc pattern is then secured to the surface thereof, and the edge of the sole-blank outside of this pattern is trimmed off, and with my device the sole-blank with its zinc pattern is placed between the pressure-roll and the feed-roll, the zinc pattern being uppermost, and the pressure-roll, being released, bears with sufficient pressure upon the pattern to force the sole against the feed-roll with enough power to cause the same to feed upon its rotation. The gage-roll must be so placed as to come in contact with the edge of the zinc pattern. Consequently, as the portion of the sole-blank which is removed must extend under it, only a very small section of the roll can project below the edge of the pressure-roll. Upon the turning of the handle of the machine the sole is fed by the feed-roll, and is guided by hand, so that the edge of the zinc pattern is kept constantly in contact with the gage-roll, and this insures the cutting from the sole-blank of the section outside the edge of the zinc pattern. The blade or knife is made of a length sufficient to permit new cutting-sections to be brought into operative position by raising or lowering the same in its holding-recesses, so that the knife does not require to be ground so often as would be the case if it had but one cutting-section. The device can also be used for rounding off tap-soles, the edge of the complete or trimmed outsole then being used as a gage.

For turning a flap the forked knife-supporting block is removed from the adjustable block, and a plate, G, (see Figs. 6, 7, and 11,) is substituted therefor. This plate has an enlarged hole, $g$, which receives a fastening-bolt, $g'$, which extends through the large slot C' in the block. The plate also has formed near its outer end a downward-extending arm, $g^2$, which has a foot, $g^3$, curved forward and a little less in width than the width of the channel in the outsole. Its inner edge is substantially straight, and its outer surface, $g^5$, is rounded from the front point backward and upward, and its upper surface, $g^6$, is curved or rounded, as represented in Fig. 7, and there extends horizontally from this arm outward or toward the pressure-rolls an arm, $g^7$, which co-operates with the foot and which has a rounded under surface. This turning device is placed as closely to the pressure and feed rolls as possible, and the foot enters the groove in the channel, and upon the feeding of the sole past it the flap is caused to ride over the rounded surface and to be folded backward upon itself by the extension $g^7$, and the pressure-roll immediately bears upon this folded section and serves to press downward the flap as it is turned over by the foot, the pressure and feed roll co-operating with the flap-turning device. There may also be used a rest, $g^8$, for the edge of the sole, comprising a roll mounted upon a pivot supported by an arm bolted to the side of the frame, which roll is arranged inside of the feed-roll, and so as to bring its inclined surface $g^9$ slightly above the same, and so that its vertical surface $g^{10}$ shall act as a guide for the edge of the sole, if desired.

In operation the pressure-roll is lifted by the treadle, the sole inserted between it and the feed-roll and so that the foot of the folding device enters the groove in the channel, the feed and pressure rolls are then turned, and the sole is guided partly by hand and partly by the folding foot which runs in the groove, and the foot remains in the groove during the turning and pressing down of the entire flap. This provides a very simple and efficient means for turning over the flap, and one which is very quick in its operation; and the flap is not only folded over, but pressed down, so that the groove in the channel is fully exposed, not only turning the flap along the side edges of the sole, but also at the toe in a manner to fully expose the groove.

In order that the device may be easily attached to a bench or support fixed in any desired position, I have formed its post with a hole, $h$, at its lower end, and have provided the base $h'$ with an extension which enters said hole. This base is adapted to be screwed to the floor, and the post is adapted to be turned upon its extension. There is also secured to the post a metal clamp, $h^2$, which has a hole, $h^3$, large enough to receive the post and permit it to be turned thereon, and a jaw, $h^4$, which is adapted to be moved against the post by a screw, $h^5$, to lock it in any position. This clamp also has the horizontal arms $h^6$, forming a horizontal recess, $h^7$, and a screw, $h^8$, in the lower arm, by which the jaw is fastened to the edge of a bench or any other equivalent support, so that by fastening the jaw to the bench and turning the post the machine may be located in any desired position, and then by locking the post to the jaw and fastening the base to the floor the machine is secured in place. It may be turned to any new position by simply loosening the jaw which locks it to the clamp and turning it, and then fastening it in such new position by the jaw.

Having thus fully described my invention, I claim and desire to secure by Letters Patent of the United States—

1. A sole-working machine having a feed-roll, a spring-held pressure-roll mounted upon a movable block, a forked knife-support carried by the movable block, and the knife and the gage-roll $e^{10}$, held in relation to said pressure feed-rolls, as described, substantially as set forth.

2. The combination, in a sole-working machine, of the feed-roll, the spring-held pressure-roll mounted upon a movable block, and a forked or two-armed knife-support having a recess at the end of each of its forks or arms, a vertical knife supported in said recesses, and a gage-roll, $e^{10}$, substantially as described.

3. The combination of the pressure-roll B', supported by a movable block, B, the forked support adjustably secured to said block, the straight knife $e^3$, held by said forked support, as specified, and a block, $e^9$, adjustably secured to said support, and carrying the gage-roll $e^{10}$, as and for the purposes described.

4. The combination of the forked support $e^5$, having the recesses $e^2$, and straight knife $e^3$, with the adjusting-screws $e^4$, substantially as described.

5. The combination of the forked support $e^5$, having the recesses $e^2$ in the ends of its arms, the adjusting-screws $e^4$, and the block $e^6$, fastened to said forked support to extend over one of the recesses, and having a stud, $e^9$, bearing a gage-roll, $e^{10}$, substantially as described.

6. The combination of the feed-roll A', the spring-held pressure-roll B', carried by the block B, the vertically-adjustable slide-block C, carried by said block, having the large slot or hole C', and screw $c^6$, for adjusting the slide vertically, and the forked knife-support $e^5$, carrying the knife $e^3$ and gage-roll $e^{10}$, and secured to said slide by a bolt passing through said slot, as and for the purposes specified.

7. The combination of the feed-roll A', the yielding pressure-roll B', supported by the block C, the straight knife $e^3$ and its forked support $e^5$, and gage-roll $e^{10}$, located in relation to the pressure and feed rolls, as specified, and the sole-support F, substantially as described.

8. The combination, in a sole-working machine, of the feed-roll A', the yielding pressure-roll B', mounted upon a movable block, B, with a channel-flap turner, G, having a guide-foot, $g^3$, and a folding arm, $g^7$, arranged in relation to the pressure and feed rolls, as specified, substantially as described.

9. The combination, in a sole-working machine, of the feed-roll A', the yielding pressure-roll B', its movable block B, a slide carried by said block having the enlarged slot or hole C', with the plate G, attached to said slide by a bolt passing through said hole, and carrying at its lower end the flap-turning device comprising a foot, $g^3$, and a turning-arm, $g^7$, as and for the purposes specified.

10. The combination, in a sole-working machine, of the feed-roll A', the yielding pressure-roll B', the flap-turning device, comprising a foot, $g^3$, having a folding arm, $g^7$, arranged in relation to the pressure and feed rolls, as specified, and a sole-support, $g^9$, substantially as described.

11. The combination, in a sole-working machine, of the feed-roll A', the yielding pressure-roll B', the flap-turning device, comprising the foot $g^3$, having a folding arm, $g^7$, arranged in relation to the pressure and feed rolls, as specified, a sole-support, $g^9$, and sole-edge gage $g^{10}$, substantially as described.

12. In a sole-working machine having a post, $a$, provided with a hole, $h$, at its lower end, a base, $h'$, having an extension which enters said hole, and a bench clamp, $h^2$, having a hole, $h^3$, through which the post $a$ extends, and also having a jaw, $h^4$, adapted to be moved against the post by a screw, $h^5$, substantially as described.

CHAS. P. STANBON.

In presence of—
F. F. RAYMOND, 2d,
J. M. DOLAN.